United States Patent
Bittner et al.

(10) Patent No.: US 10,018,907 B2
(45) Date of Patent: Jul. 10, 2018

(54) METHOD OF OPERATING A MICROLITHOGRAPHIC PROJECTION APPARATUS

(71) Applicant: Carl Zeiss SMT GmbH, Oberkochen (DE)

(72) Inventors: Boris Bittner, Roth (DE); Norbert Wabra, Werneck (DE); Sonja Schneider, Oberkochen (DE); Ricarda Schoemer, Zusmarshausen (DE); Martin von Hodenberg, Oberkochen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 41 days.

(21) Appl. No.: 15/041,149

(22) Filed: Feb. 11, 2016

(65) Prior Publication Data

US 2016/0161845 A1  Jun. 9, 2016

Related U.S. Application Data

(63) Continuation of application No. PCT/EP2013/002767, filed on Sep. 14, 2013.

(51) Int. Cl.
*G06F 17/50* (2006.01)
*G03F 1/70* (2012.01)
(Continued)

(52) U.S. Cl.
CPC ............... *G03F 1/70* (2013.01); *G03F 7/705* (2013.01); *G03F 7/70258* (2013.01);
(Continued)

(58) Field of Classification Search
CPC .......... G03F 7/705; G03F 7/7015; G03F 1/70; G03F 7/70258; G03F 7/70266;
(Continued)

(56) References Cited

U.S. PATENT DOCUMENTS 6,338,823 B1  1/2002  Furukawa
6,504,597 B2  1/2003  Schuster et al.
(Continued)

FOREIGN PATENT DOCUMENTS

DE  10 2012 205 096 B3  8/2013
DE  10 2012 212 758      1/2014
(Continued)

OTHER PUBLICATIONS

Bikcora et al.; "Lens Heating Induced Aberration Prediction via Nonlinear Kalman Filters"; Year: 2012, IEEE Transactions on Semiconductor Manufacturing; vol. 25, Issue: 3; pp. 384-393.*
(Continued)

*Primary Examiner* — Helen Rossoshek
(74) *Attorney, Agent, or Firm* — Fish & Richardson P.C.

(57) ABSTRACT

A method of operating a microlithographic projection exposure apparatus includes, in a first step, providing a projection objective that includes a plurality of real manipulators. In a second step, a virtual manipulator is defined that is configured to produce preliminary control signals for at least two of the real manipulators. In a third step, performed during operation of the apparatus, a real image error of the projection objective is determined. In a fourth step, a desired corrective effect is determined. In a fifth step, first virtual control signals for the virtual manipulator are determined. In a sixth step, second virtual control signals for the real manipulators are determined.

18 Claims, 5 Drawing Sheets

(51) Int. Cl.
*G03F 7/20* (2006.01)
*G03F 1/00* (2012.01)

(52) U.S. Cl.
CPC .......... *G06F 17/5081* (2013.01); *G03F 1/144* (2013.01); *G06F 17/5068* (2013.01); *G06F 2217/12* (2013.01)

(58) Field of Classification Search
CPC .............. G03F 7/7085; G03F 7/70883; G03F 7/70483; G03F 7/70491; G03F 7/70616; G03F 7/70733; G03F 7/70283; G03F 7/70058; G03F 7/70308; G03F 7/70516; G03F 7/70525; G03F 7/0002; G03F 9/7092; G03F 17/5081
See application file for complete search history.

(56) References Cited

U.S. PATENT DOCUMENTS

| | | | | |
|---|---|---|---|---|
| 6,741,331 | B2* | 5/2004 | Boonman | G03F 7/703 355/53 |
| 6,784,977 | B2* | 8/2004 | von Bunau | G03F 7/70308 355/53 |
| 7,158,237 | B2* | 1/2007 | Schriever | G02B 5/0221 356/515 |
| 7,259,761 | B2* | 8/2007 | Shih | G06F 3/016 345/419 |
| 7,301,646 | B2* | 11/2007 | Wegmann | G03F 7/706 356/512 |
| 7,307,695 | B2* | 12/2007 | Hazenberg | G03F 7/7075 355/53 |
| 7,336,371 | B1* | 2/2008 | Haidner | G01M 11/0271 356/515 |
| 7,456,933 | B2* | 11/2008 | Wegmann | G03F 7/701 355/67 |
| 7,580,113 | B2* | 8/2009 | Tel | G03B 27/53 355/53 |
| 7,800,732 | B2* | 9/2010 | Zimmermann | G03F 7/70333 355/53 |
| 7,830,611 | B2 | 11/2010 | Conradi et al. | |
| 7,990,622 | B2* | 8/2011 | Conradi | G02B 3/14 359/648 |
| 8,228,483 | B2* | 7/2012 | Loering | G03F 1/62 355/52 |
| 9,703,206 | B2* | 7/2017 | Natt | G03F 7/70133 |
| 9,760,019 | B2* | 9/2017 | Bittner | G03F 7/70616 |
| 2003/0025979 | A1* | 2/2003 | Chan | G03F 7/70291 359/279 |
| 2005/0151953 | A1* | 7/2005 | Sewell | G03F 7/70283 355/71 |
| 2005/0240544 | A1 | 10/2005 | Kil et al. | |
| 2005/0280910 | A1 | 12/2005 | Fehr et al. | |
| 2006/0046165 | A1 | 3/2006 | Laan et al. | |
| 2008/0106711 | A1* | 5/2008 | Beierl | G03F 7/70891 355/30 |
| 2009/0103065 | A1 | 4/2009 | Yoshihara et al. | |
| 2009/0231565 | A1* | 9/2009 | Conradi | G03F 7/70266 355/55 |
| 2009/0257032 | A1 | 10/2009 | Eva et al. | |
| 2009/0296055 | A1* | 12/2009 | Ye | G03F 7/70266 355/30 |
| 2010/0128367 | A1 | 5/2010 | Beckenbach et al. | |
| 2010/0128969 | A1* | 5/2010 | Cao | G03F 7/705 382/144 |
| 2010/0201958 | A1 | 8/2010 | Hauf et al. | |
| 2010/0321661 | A1* | 12/2010 | Natt | G03F 7/70091 355/67 |
| 2012/0084044 | A1* | 4/2012 | Dmitriev | B82Y 10/00 702/127 |
| 2012/0188524 | A1 | 7/2012 | Bittner et al. | |
| 2013/0188246 | A1* | 7/2013 | Rogalsky | G02B 17/0663 359/351 |
| 2013/0258303 | A1* | 10/2013 | Natt | G03F 7/70091 355/67 |
| 2015/0022792 | A1* | 1/2015 | Gorkhover | G03F 7/70266 355/52 |
| 2015/0029479 | A1* | 1/2015 | Graeschus | G03F 7/70258 355/67 |
| 2015/0160562 | A1 | 6/2015 | Bittner et al. | |
| 2016/0033873 | A1 | 2/2016 | Bittner et al. | |
| 2016/0216616 | A1* | 7/2016 | Bittner | G03F 7/70616 |
| 2016/0299436 | A1* | 10/2016 | Rist | G03F 7/70266 |
| 2017/0052355 | A1* | 2/2017 | Schicketanz | G02B 13/14 |
| 2017/0115576 | A1* | 4/2017 | Bittner | G03F 7/7015 |

FOREIGN PATENT DOCUMENTS

| | | |
|---|---|---|
| JP | 2007-240510 A | 9/2007 |
| JP | 2007-535079 A | 11/2007 |
| WO | WO 2010/034674 | 4/2010 |
| WO | WO 2011/116792 A1 | 9/2011 |
| WO | WO 2013/044936 A1 | 4/2013 |

OTHER PUBLICATIONS

International Search Report and Written Opinion for corresponding PCT Appl No. PCT/EP2013/002767, dated Jul. 8, 2014.
Japanese Office Action, with translation thereof, for JP Appl No. 2016-520691, dated Aug. 22, 2016.
Weber et al., "Improved iterative regularization for vibration-based damage detection," Nondestructive Evaluation and Health Monitoring of Aerospace Materials, Composites, and Civil Infrastructure IV, edited by Shull, Gyekenyesi, Mufti, Proc. of SPIE, 2005, vol. 5767 pp. 132-142.
Douma et al., "Nonlinear regularization techniques for seismic tomography," arXiv [physics.geo-ph], Aug. 18, 2010, pp. 1-23.

\* cited by examiner

METHOD OF OPERATING A MICROLITHOGRAPHIC PROJECTION APPARATUS

CROSS-REFERENCE TO RELATED APPLICATION

The present application is a continuation of, and claims benefit under 35 USC 120 to, international application PCT/EP2013/002767, filed Sep. 14, 2013. The entire disclosure of international application PCT/EP2013/002767 is incorporated by reference herein

FIELD

The disclosure generally relates to a method of operating a microlithographic projection exposure apparatus or other types of projection apparatus, for example apparatus that are used for mask inspection. The disclosure particularly concerns a method in which image errors in a projection objective of a microlithographic projection apparatus are continuously reduced during the operation. To this end a real-time control of manipulators is performed that modify optical properties of optical elements contained in the projection objective.

BACKGROUND

Microlithography (also called photolithography or simply lithography) is a technology for the fabrication of integrated circuits, liquid crystal displays and other microstructured devices. The process of microlithography, in conjunction with the process of etching, is used to pattern features in thin film stacks that have been formed on a substrate, for example a silicon wafer. At each layer of the fabrication, the wafer is first coated with a photoresist which is a material that is sensitive to radiation, such as deep ultraviolet (DUV), vacuum ultraviolet (VUV) or extreme ultraviolet (EUV) light. Next, the wafer with the photoresist on top is exposed to projection light through a mask in a projection exposure apparatus. The mask contains a circuit pattern to be projected onto the photoresist. After exposure the photoresist is developed to produce an image corresponding to the circuit pattern contained in the mask. Then an etch process transfers the circuit pattern into the thin film stacks on the wafer. Finally, the photoresist is removed. Repetition of this process with different masks results in a multi-layered microstructured component.

A projection exposure apparatus typically includes an illumination system, a mask alignment stage for aligning the mask, a projection objective and a wafer alignment stage for aligning the wafer coated with the photoresist. The illumination system illuminates a field on the mask that may have the shape of a rectangular slit or a narrow ring segment, for example.

In current projection exposure apparatus a distinction can be made between two different types of apparatus. In one type each target portion on the wafer is irradiated by exposing the entire mask pattern onto the target portion in one go; such an apparatus is commonly referred to as a wafer stepper. In the other type of apparatus, which is commonly referred to as a step-and-scan apparatus or simply scanner, each target portion is irradiated by progressively scanning the mask pattern under the projection light beam in a given reference direction while synchronously scanning the substrate parallel or anti-parallel to this direction. The ratio of the velocity of the wafer and the velocity of the mask is equal to the magnification $\beta$ of the projection lens. A typical value for the magnification is $\beta=\pm\frac{1}{4}$. It is to be understood that the term "mask" (or reticle) is to be interpreted broadly as a patterning device. Commonly used masks contain transmissive or reflective patterns and may be of the binary, alternating phase-shift, attenuated phase-shift or various hybrid mask type, for example.

One of the main aims in the development of projection exposure apparatus is to be able to lithographically produce structures with smaller and smaller dimensions on the wafer. Small structures lead to high integration densities, which generally has a favorable effect on the performance of the microstructured components produced with the aid of such apparatus. Furthermore, the more devices can be produced on a single wafer, the higher is the throughput of the apparatus.

The size of the structures which can be generated depends primarily on the resolution of the projection objective being used. Since the resolution of projection objectives is inversely proportional to the wavelength of the projection light, one way of increasing the resolution is to use projection light with shorter and shorter wavelengths. The shortest wavelengths currently used are 248 nm, 193 nm and 13.5 nm and thus lie in the deep (DUV), vacuum (VUV) and extreme (EUV) ultraviolet spectral range, respectively. Future apparatus may use light having a wavelength as low as 6.9 nm (soft X-rays).

The correction of image errors (this term is used herein as synonym for aberrations) is becoming increasingly important for projection objectives with very high resolution. Different types of image errors usually involve different corrective measures.

The correction of rotationally symmetric image errors is comparatively straightforward. An image error is referred to as being rotationally symmetric if it is invariant against a rotation of the optical system. Rotationally symmetric image errors can be corrected, for example, at least partially by moving individual optical elements along the optical axis Correction of those image errors which are not rotationally symmetric is more difficult. Such image errors occur, for example, because lenses and other optical elements heat up rotationally asymmetrically. One image error of this type is astigmatism.

A major cause for rotationally asymmetric image errors is a rotationally asymmetric, in particular slit-shaped, illumination of the mask, as is typically encountered in projection exposure apparatus of the scanner type. The slit-shaped illuminated field causes a non-uniform heating of those optical elements that are arranged in the vicinity of field planes. This heating results in deformations of the optical elements and, in the case of lenses and other elements of the refractive type, in changes of their refractive index. If the materials of refractive optical elements are repeatedly exposed to the high energetic projection light, also permanent material changes are observed. For example, sometimes a compaction of the materials exposed to the projection light occurs, and this compaction results in local and permanent changes of the refractive index.

The heat induced deformations, index changes and coating damages alter the optical properties of the optical elements and thus cause image errors. Heat induced image errors sometimes have a twofold symmetry with respect to the optical axis. However, image errors with other symmetries, for example threefold or fivefold, are also frequently observed in projection objectives.

Another major cause for rotationally asymmetric image errors are certain asymmetric illumination settings in which the pupil plane of the illumination system is illuminated in a rotationally asymmetric manner. Important examples for such settings are dipole settings in which only two poles are illuminated in the pupil plane. With such a dipole setting, the pupil planes in the projection objective contain two strongly illuminated regions. Consequently, lenses or mirrors arranged in or in the vicinity of these pupils plane are exposed to a rotationally asymmetric intensity distribution that gives rise to rotationally asymmetric image errors. Also quadrupole settings often produce rotationally asymmetric image errors, although to a lesser extent than dipole settings.

In order to correct image errors, most projection objectives contain correction devices that alter an optical property of at least one optical element contained in the projection objective. In the following some known correction devices will be briefly described.

For correcting rotationally asymmetric image errors, U.S. Pat. No. 6,338,823 B1 proposes a correction device that deforms a lens. To this end the correction device comprises a plurality of actuators that are arranged along the circumference of the lens. The deformation of the lens is determined such that heat induced image errors are at least partially corrected. More complex types of such a correction device are disclosed in US 2010/0128367 A1 and U.S. Pat. No. 7,830,611 B2.

The deformation of optical elements with the help of actuators also has some drawbacks. If the actuators are arranged along the circumference of a plate or a lens, it is possible to produce only a restricted variety of deformations with the help of the actuators. This is due to the fact that both the number and also the arrangement of the actuators are fixed. In particular it is usually difficult or even impossible to produce deformations which may be described by higher order Zernike polynomials, such as $Z_{10}$, $Z_{36}$, $Z_{40}$ or $Z_{64}$.

US 2010/0201958 A1 and US 2009/0257032 A1 disclose a correction device that comprises two transparent optical elements that are separated from each other by a liquid. An optical wavefront correction is produced by changing the refractive index of the optical elements locally. To this end one optical element may be provided with heating wires that extend over the entire surface and can be controlled individually. The liquid ensures that the average temperatures of the optical elements are kept constant. A wide variety of image errors can be corrected very well.

WO 2011/116792 A1 discloses a correction device in which a plurality of fluid flows emerging from outlet apertures enter a space through which projection light propagates during operation of the projection exposure apparatus. A temperature controller sets the temperature of the fluid flows individually for each fluid flow. The temperature distribution is determined such that optical path length differences caused by the temperature distribution correct image errors.

U.S. Pat. No. 6,504,597 B2 and WO 2013/044936 A1 propose correction devices in which heating light is coupled into a lens or a plate via its peripheral rim surface, i.e. circumferentially. Optical fibers may be used to direct the heating light produced by a single light source to the various locations distributed along the periphery of the optical element.

The correction devices described above differ with respect to their degree of freedom. The degree of freedom of a correction device is the number of parameters that may be varied independently. Often the degree of freedom is associated with the number of actuators that can be controlled independently. For example, if a correction device comprises one actuator that is configured to displace a lens along the optical axis, the degree of freedom is 1. The same is true for a correction device comprising two or more actuators if the actuators can only be controlled simultaneously by applying the same control signals to all three actuators.

In correction devices that bend optical elements, the degree of freedom is often greater than 1. An even higher degree of freedom can be found in correction devices that produce variable temperature distributions. For example, in the correction device disclosed in above-mentioned US 2010/0201958 A, each heating wire represents one degree of freedom. If the correction device comprises, say, 200 heating wires, the degree of freedom is therefore 200.

In the following each degree of freedom of a correction device will be referred to as a manipulator. This term stems from early known solutions in which the position of lenses and other optical elements could be manually adjusted with the help of micrometer screws. Then each screw represents one degree of freedom. Meanwhile the term manipulator is widely used in the art to denote more generally any component that is configured to alter, in response to a control signal applied to the manipulator, an optical property of at least one optical element.

If a projection objective contains several correction devices each having a degree of freedom in a range between 1 and several dozens, the total degree of freedom in the projection objective can be very significant and may exceed 100, for example. Then it is a difficult task to control each manipulator such that an image error, which has been measured or anticipated by extrapolation, is completely corrected or at least reduced to a tolerable extent.

The reasons for this difficulty are manifold. One reason is that the optical effect produced by each manipulator is usually complex. Often the optical effect is described with reference to the optical wavefronts that are associated with points in the image plane of the objective. In an aberration-free projection objective the optical wavefronts have a spherical shape. In the presence of image errors the optical wavefront deviates from the ideal spherical shape. Such wavefront deformations can be measured with the help of interferometers in the image plane of the objective, for example. As an alternative, the wavefront deformations can be computed if the optical properties of the objective are exactly known or can be reliably forecast using simulation programs.

One well-established way in the art of optics to describe wavefront deformations is to expand the deformation into Zernike polynomials. These polynomials $Z_j(\rho,\varphi)$, with $(\rho,\varphi)$ representing polar coordinates, form a normalized and orthogonal complete function set so that any arbitrary function depending on two variables can be decomposed into these polynomials. Zernike polynomials are widely used because many of them describe familiar third-order aberrations. Thus the expansion coefficients, which are often referred to as Zernike coefficients, can be directly associated with these image errors.

Unfortunately there are only very few manipulators that affect only one Zernike coefficient. Usually each manipulator affects a plurality of Zernike coefficients. If there are several hundreds manipulators each affecting several Zernike coefficients, it is difficult to determine how the manipulators have to be controlled such that a corrective effect is achieved to reduce the image error.

Additional complexity is added by the fact that the manipulators underlie certain constraints. Among others, manipulators have a limited range and a limited response time. For example, displacements of a lens along the optical axis with the help of a manipulator may be restricted to a range of a few micrometers or to a range of a few hundred micrometers, and the response time to displace the lens over the entire range may be one second. Other manipulators have response times in the order of a few milliseconds, and other manipulators have response times in the order of several seconds or even minutes. Thus, if image errors increase suddenly and a quick response time is desired, slow manipulators may have to be disregarded completely in a first step. On the other hand, the optical effect on the wavefront deformation that is achieved by fast manipulators may in some cases be too weak. Therefore usually a combination of fast and slow manipulators is provided in sophisticated projection objectives.

It is relatively easy to determine the optical effect that is produced by the manipulators if a given set of control signals are applied to the manipulators. This is a direct problem which can be solved by computing the effect of each manipulator individually and then superimposing these effects.

However, determining how the manipulators have to be controlled such that they commonly produce a desired corrective effect on a wavefront deformation is a so-called inverse problem. If no exact solution exists for the inverse problem, as this is usually the case, it is referred to in the art as ill-posed problem. Such ill-posed problems can often be solved satisfactorily by applying regularization algorithms.

US 2012/0188524 A1 discloses a method of controlling the manipulators of a projection objective in which a numerical stabilization of the inverse problem is achieved by performing a Singular Value Decomposition (SVD) or a Tikhonov regularization. The determination of the weight $\gamma$ for the Tikhonov regularization is preferably obtained by using the L-curve method. The stabilized inverse problem is converted into a minimization problem that is solved, after determining boundary conditions for the minimization problem, by using numerical methods such as Simplex method or other methods, for example linear programming, quadratic programming or simulated annealing.

Unpublished German patent application DE 10 2012 212 758 discloses a control scheme for the manipulators of a projection objective in which slowly changing image errors and faster changing image errors are corrected independently from each other on different time scales.

WO 2013/044936 A1, which has been mentioned further above, describes that the intensity of heating light beams that are directed on the peripheral rim surface of a lens or a plate can be controlled in a similar manner as it is described in the above-mentioned US 2012/0188524 A1. In one embodiment intensities of the heating light beams, which are involved for producing specific refractive index distributions, are determined off-line. These specific distributions may be described, for example, by certain Zernike polynomials which are also used to describe wavefront deformations. During the operation of the projection exposure apparatus the desired refractive index distribution in the lens or plate is decomposed into a linear superposition of the specific (Zernike) distributions for which the desired intensities of the heating light beams have been determined off-line. The resulting intensities for the individual heating light beams are then a sum of the intensities that are associated with the specific distributions, but weighed by superposition coefficients. Since the number of specific Zernike distributions is much smaller than the number of heating light beams, this approach ultimately results in a decrease of the degree of freedom and therefore makes it possible to determine the desired intensities of the individual heating light beams much quicker.

The known control of manipulators in projection objectives generally suffers from the inability to provide an extremely fast real-time control on the one hand, but to nevertheless achieve a good correction of image errors on the other hand. This inability may result in flaws in the electronic components to be produced, or in a reduced throughput because the operation of the projection exposure apparatus has to be interrupted until the image errors are within tolerable limits again.

Incidentally, the above remarks apply equally to mask inspection apparatus. These apparatus are used to inspect masks in order to ensure that the masks do not contain flaws. They differ from projection exposure apparatus mainly in that the wafer coated with the photoresist is replaced by an electronic image sensor.

SUMMARY

The disclosure seeks to provide a method of operating a microlithographic projection apparatus which makes it possible to control a large number of manipulators extremely fast, but which nevertheless achieves a good correction of image errors.

In accordance with the present disclosure, this object is achieved by a method comprising the following steps:
a) providing a projection objective comprising
   a plurality of optical elements arranged along a projection light path, and
   a plurality of real manipulators, wherein each real manipulator is configured to alter, in response to a final control signal applied to the respective real manipulator, an optical property of at least one of the optical elements;
b) defining a virtual manipulator, wherein the virtual manipulator is configured to produce, in response to a first virtual control signal applied to the virtual manipulator, preliminary control signals for at least two of the real manipulators according to a predetermined control scheme;
c) during operation of the apparatus,
   determining a real image error of the projection objective;
   determining a desired corrective effect that depends on the real image error;
   determining, depending of the desired corrective effect, the first virtual control signal for the virtual manipulator and second virtual control signals for each of the real manipulators;
d) determining final control signals for the real manipulators, the final control signals being a function of the first virtual control signals and the second virtual control signals;
e) applying the final control signals determined in step d) to the real manipulators so that the optical properties of the at least one optical element alter in a manner that results in a modification, and in particular an at least partial correction, of the real image error;
f) illuminating at least a portion of a mask with projection light, wherein the mask is arranged in an object plane of the projection objective;
g) forming an image of the mask in an image plane of the projection objective.

The disclosure is based on the perception that the concept of a virtual manipulator makes it possible to combine the benefits of slow, but very accurate control algorithms on the one hand with less accurate algorithms that are suitable for a fast real-time control of the manipulators. In contrast to known approaches, the disclosure deliberately increases the degree of freedom by adding one or more virtual manipulators. If certain real manipulators are combined in known solutions to form some kind of virtual manipulator, this is always done with the aim of reducing the degree of freedom and thus the complexity of the problem. According to the disclosure, however, one or more virtual manipulators are added, but without reducing the number of real manipulators for which final control signals have to be computed individually. Thus the degree of freedom and the complexity is indeed increased, but with the benefit of a better correction of image errors in projection exposure or mask inspection apparatus, and without compromising the ability to control the manipulators under real-time conditions.

In an embodiment step b) comprises the further steps of
b1) determining an hypothetic image error of the projection objective;
b2) determining control ranges of each of the real manipulators, wherein the control range of a particular real manipulator defines the allowed values of the final control signals that can be applied to the particular real manipulator;
b3) determining the control scheme so that
  the real manipulators would, if only hypothetic preliminary control signals, which are produced by the virtual manipulator in response to a hypothetic first virtual control signal, were applied to the real manipulators, alter the optical property of the at least one of the optical elements in a manner that results in a modification, and in particular in an at least partial correction, of the hypothetic image error, and that
  the hypothetic preliminary control signals are within the control ranges determined in step b2).

The virtual manipulator is therefore adapted to correct very effectively the hypothetic image error of the projection objective. Particularly if this hypothetic image error is identical or very similar to a real image error that has already been observed or is expected to occur during the operation of the apparatus, this hypothetic image error can be corrected very fast and effectively with the help of the virtual manipulator, because the hypothetic preliminary control signals can be computed off-line using slow but very accurate algorithms.

If there are, for example, six different real image errors that have already occurred or are expected to occur during the operation of the apparatus, it may be envisaged to provide a corresponding number of six virtual manipulators each being specifically adapted to correct one of the six hypothetic image errors. If one assumed that the real image errors simply changes during operation of the apparatus between the six hypothetic image errors, it is merely necessary to activate the virtual manipulator that if associated with the image error presently observed in the projection objective. This virtual manipulator then controls the real manipulators in a manner that has been computed off-line before.

Usually, however, the real image errors will not be identical to the hypothetic image errors. Therefore the above concept of simply changing between the virtual manipulators will not be sufficient to correct complex real image errors. However, even if a real image error may be described, for example, as a combination of two hypothetic image errors plus an additional image error component for which no virtual manipulator is available, the disclosure provides a significant improvement with the respect to the correction of such an image error. In that case two virtual manipulators would be strongly activated, and some other real manipulators would, in combination with the two virtual manipulators, correct the additional image error component.

Generally the benefits obtained by the introduction of the at least one virtual manipulator are greatest if the real image error resembles as much as possible the hypothetic image error for which the at least one virtual manipulator has been defined. Since in real apparatus there are always typical constellations resulting in a specific type of image error (for example different types of astigmatism due to dipole illumination settings or asymmetrical heating of optical elements), the benefits obtained with the introduction of at least one virtual manipulator are usually very significant.

Since the determination of the control scheme according to step b3) is preferably performed off-line, it is possible to determine the control scheme so that the real manipulators would, if only the hypothetic preliminary control signals, which are produced by the virtual manipulator in response to a hypothetic first virtual control signal, were applied to the real manipulators, alter the optical property of the at least one of the optical elements in step b3) in a manner that results in the best possible correction of the hypothetic image error according to a predefined criterion that is used to evaluate the image errors.

Different predefined criteria may be used to evaluate the image errors. According to one criterion a residual wavefront deformation, which remains after the correction of the hypothetical image error, is expanded into Zernike polynomials. A correction of the hypothetic image error is then considered as the best possible correction if a maximum absolute value among all Zernike coefficients of this expansion is smaller than a corresponding maximum absolute value among all Zernike coefficients that are obtained if a residual wavefront error is expanded that remains after the correction of the hypothetical image error that is not corrected by the best possible correction.

Such a best possible correction may be obtained if in step b3) the control scheme is determined by solving a minimization problem using a convex programming algorithm, in particular a sequential quadratic programming algorithm, and more particularly a quadratic programming algorithm. Such convex programming algorithms are comparatively slow and therefore generally not suitable to be carried out under real-time conditions.

However, for the off-line determination of the control scheme in step b3) a convex programming algorithm produces the best possible results for the criterion that has been mentioned above.

In one embodiment a functional dependency between the hypothetic preliminary virtual control signals and the hypothetic first virtual control signals constitutes the control scheme. If the control scheme is not determined on the basis of a hypothetic image error of the projection objective, other, and generally arbitrary, functional dependencies may determine the control scheme.

In one embodiment the control range associated with one of the real manipulators depends on the first and/or the second virtual control signals that are supplied to another one of the real manipulators. In other words, the control ranges are no fixed values, but may depend themselves on virtual control signals that are supplied to another one of the real manipulators. This dependency may take into account, for example, that due to space restrictions it is not possible to displace two very closely arranged lenses in the projection objective in a direction towards each other, because using the full range of each manipulator may then result in a collision of the lenses.

In one embodiment the method comprises the step of determining, for each real manipulator, how an optical wavefront passing through the projection objective is affected if a final control signal is applied to the respective real manipulator. Such a determination is usually involved for predicting how the real manipulators have to be controlled so that a desired corrective effect is achieved.

In one embodiment the first virtual control signals for the virtual manipulator and second virtual control signals for each of the real manipulators are determined in step c) by solving a minimization problem. Such minimization problems usually occur if the problem as such is ill-posed. For solving the minimization problem a regularization algorithm, and preferably the Tikhonov regularization algorithm or singular value decomposition with thresholding (SVI), may be used.

In one embodiment the at least two real manipulators, for which the virtual manipulator produces preliminary control signals, are configured to alter an optical property of at least two different optical elements. In that case the virtual manipulator is not simply a manipulator that controls simultaneously a plurality of actuators acting on the same optical element, but represents a higher control level that simultaneously influences optical properties of at least two different optical elements.

In particular the at least two different optical elements may be separated from each other by at least one further optical element having a curved surface on which the projection light impinges during operation of the apparatus. This again expresses the idea that the virtual manipulator controls completely different real manipulators.

Subject of the disclosure is also a computer program which is configured, if running on a computer, to cause the computer to perform the following steps:
a) defining a virtual manipulator that produces, in response to a virtual control signal applied to the virtual manipulator, preliminary control signals for at least two real manipulators according to a predetermined control scheme, wherein the real manipulators are contained in a projection objective of a microlithographic projection apparatus, the projection objective comprising a plurality of optical elements arranged along a projection light path, and wherein each real manipulator is configured to alter, in response to a final control signal applied to the respective real manipulator, an optical property of at least one of the optical elements;
b) during operation of the apparatus, determining a desired corrective effect that depends on a real image error, and determining, depending of the desired corrective effect, the first virtual control signals for the virtual manipulator and second virtual control signals for each of the real manipulators;
c) determining final control signals for the real manipulators, the final control signals being a function of the first virtual control signals and the second virtual control signals, wherein, if the final control signals determined in step d) are applied to the real manipulators, the optical properties of the at least one optical element alter in a manner that results in a modification, and in particular an at least partial correction, of the real image error.

Such a program may also consist of several individual programs that run on different computers. For example, a first individual program may perform step a), and a second individual program may perform steps b) and c).

Subject of the disclosure is also a data carrier, on which such a computer program is stored, and a computer on which such a computer program is installed.

Subject of the disclosure is also a method of operating a microlithographic projection apparatus comprising the following steps:
a) providing a projection objective comprising a plurality of real manipulators;
b) defining a virtual manipulator that is configured to produce preliminary control signals for at least two of the real manipulators;
c) determining a real image error of the projection objective;
d) determining a desired corrective effect;
e) determining first virtual control signals for the virtual manipulator;
f) determining second virtual control signals for the real manipulators;
g) determining final control signals for the real manipulators as a function of the first and second virtual control signals;
h) applying the final control signals to the real manipulators.

DEFINITIONS

The term "light" denotes any electromagnetic radiation, in particular visible light, UV, DUV, VUV and EUV light.

The term "light ray" is used herein to denote light whose path of propagation can be described by a line.

The term "chief ray" is used herein to denote a central meridional ray of a light bundle that emerges from an off-axis object point.

The term "marginal ray" is used herein to denote a ray that emerges from an object point with the greatest possible angle with respect to the optical axis.

The term "light beam" is used herein to denote a plurality of substantially collimated light rays. A light beam usually has a substantially continuous intensity profile across its diameter.

The term "optically conjugate" is used herein to denote the imaging relationship between two points or two surfaces. Imaging relationship means that a light bundle emerging from a point converges at the optically conjugate point.

The term "field plane" is used herein to denote the mask plane or a plane that is optically conjugate to the mask plane.

The term "pupil plane" is used herein to denote a plane in which marginal rays passing through different points in the mask plane or another field plane intersect. In this plane all chief rays intersect the optical axis. As usual in the art, the term "pupil plane" is also used if it is in fact not a plane in the mathematical sense, but is slightly curved so that, in a strict sense, it should be referred to as pupil surface.

The term "correction of an image error" is used herein to denote a modification of an image error that results in a smaller residual image error as defined on the basis of Zernike coefficients describing a wavefront deformation. A residual image error is considered as being smaller if either the RMS (root means square) or a smaller maximum norm of the residual image error decreases.

BRIEF DESCRIPTION OF THE DRAWINGS

Various features and advantages of the present disclosure may be more readily understood with reference to the following detailed description taken in conjunction with the accompanying drawings in which.

DESCRIPTION OF THE PREFERRED EMBODIMENTS

I. General Construction of Projection Exposure Apparatus

Figure 1:
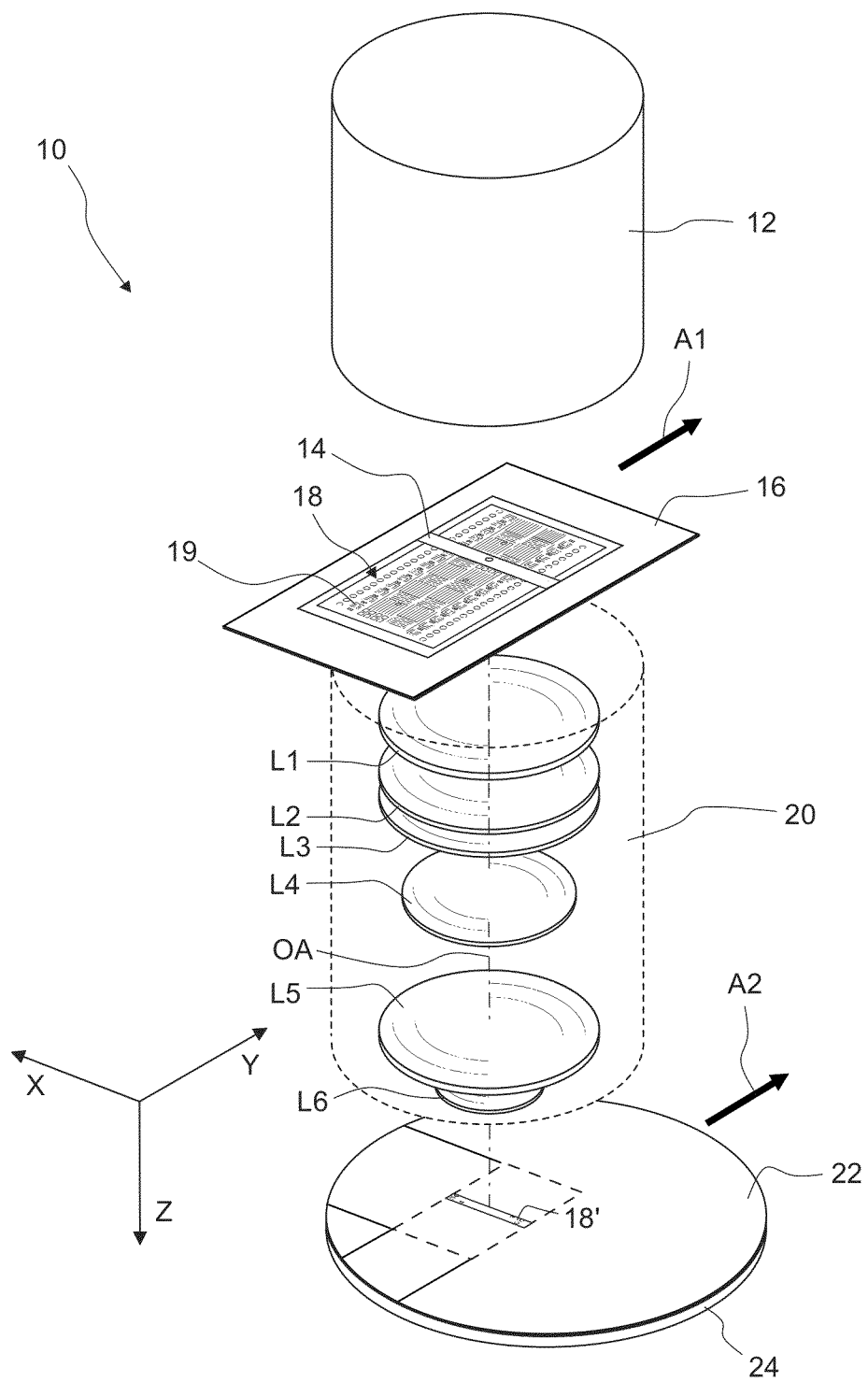
FIG. 1 is a schematic perspective view of a projection exposure apparatus in accordance with one embodiment of the present disclosure.

FIG. 1 is a perspective and highly simplified view of a projection exposure apparatus 10 in accordance with the present disclosure. The apparatus 10 comprises an illumination system 12 which produces projection light. The latter illuminates a field 14 on a mask 16 containing a pattern 18 of fine features 19. In this embodiment the illuminated field 14 has a rectangular shape. However, other shapes of the illuminated field 14, for example ring segments, are contemplated as well.

A projection objective 20 having an optical axis OA and containing a plurality of lenses L1 to L6 images the pattern 18 within the illuminated field 14 onto a light sensitive layer 22, for example a photoresist, which is supported by a substrate 24. The substrate 24, which may be formed by a silicon wafer, is arranged on a wafer stage (not shown) such that a top surface of the light sensitive layer 22 is precisely located in an image plane of the projection objective 20. The mask 16 is positioned via a mask stage (not shown) in an object plane of the projection objective 20. Since the latter has a magnification β with |β|<1, a minified image 18' of the pattern 18 within the illuminated field 14 is projected onto the light sensitive layer 22.

During the projection the mask 16 and the substrate 24 move along a scan direction which corresponds to the Y direction indicated in FIG. 1. The illuminated field 14 then scans over the mask 16 so that patterned areas larger than the illuminated field 14 can be continuously imaged. The ratio between the velocities of the substrate 24 and the mask 16 is equal to the magnification β of the projection objective 20. If the projection objective 20 does not invert the image (β>0), the mask 16 and the substrate 24 move along the same direction, as this is indicated in FIG. 1 by arrows A1 and A2. However, the present disclosure may also be used with catadioptric projection objectives 20 having off-axis object and image fields, and also in apparatus of the stepper type in which the mask 16 and the substrate 24 do not move during the projection of the mask.

Figure 2:
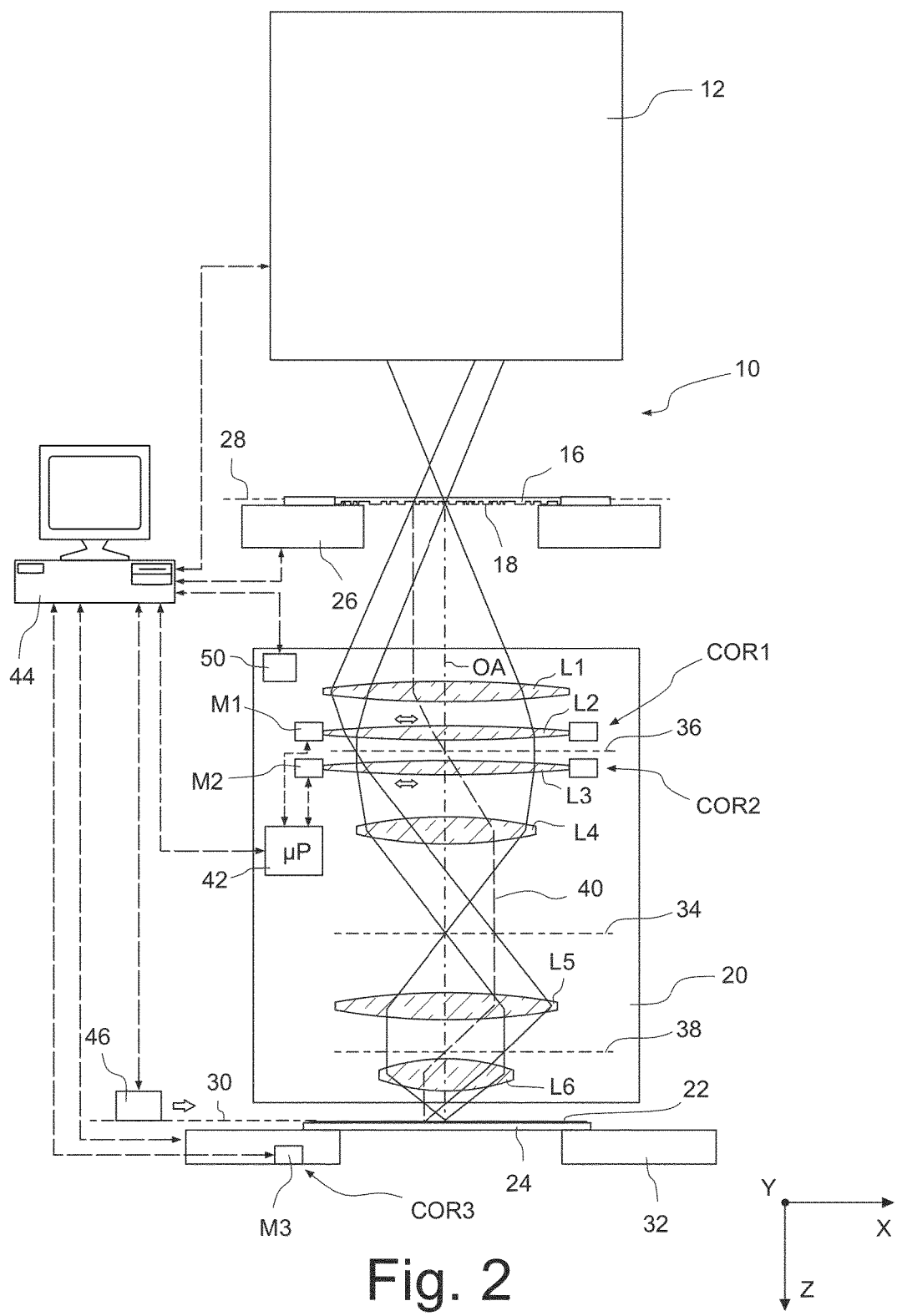
FIG. 2 is schematic meridional section through the apparatus shown in FIG. 1.

FIG. 2 is a schematic meridional section through the apparatus 10 shown in FIG. 1. In this section also a mask stage 26, which supports the mask 16 in an object plane 28 of the projection objective 20, and a wafer stage 32, which supports the substrate 24 in an image plane 30 of the projection objective 20, are shown.

In this embodiment the projection objective 20 has an intermediate image plane 34 and a first pupil plane 36, which is arranged between the object plane 28 and the intermediate image plane 34. A second pupil plane 38 is arranged between the intermediate image plane 34 and the image plane 30 of the projection objective 20. In the pupil planes 36, 38 marginal rays passing through different points in the mask plane or another field plane intersect. Furthermore, chief rays such as ray 40 indicated as a broken line intersect the optical axis OA in the pupil planes 36, 38.

II. Correction Devices

The projection objective 20 comprises a first correction device COR1, a second correction device COR2 and a third correction device COR3 that are configured to correct image errors of the projection objective 20.

The first correction device COR1 comprises a manipulator M1 that is configured to displace the second lens L2 along the X direction. The mechanical constitution of such a manipulator is known in the art as such and will therefore not be described in further detail. Since the second lens L2 is located very closely to the first pupil plane 36, the optical effect produced by a displacement of the second lens L2 is, at least approximately, field independent. This means that the displacement affects the optical wavefronts associated to arbitrary field points in the image plane 30 in a substantially identical manner. In this context it has to be recalled that in a pupil plane the optical wavefronts associated to all field points completely overlap.

Figures 3A, 3B, 3C:
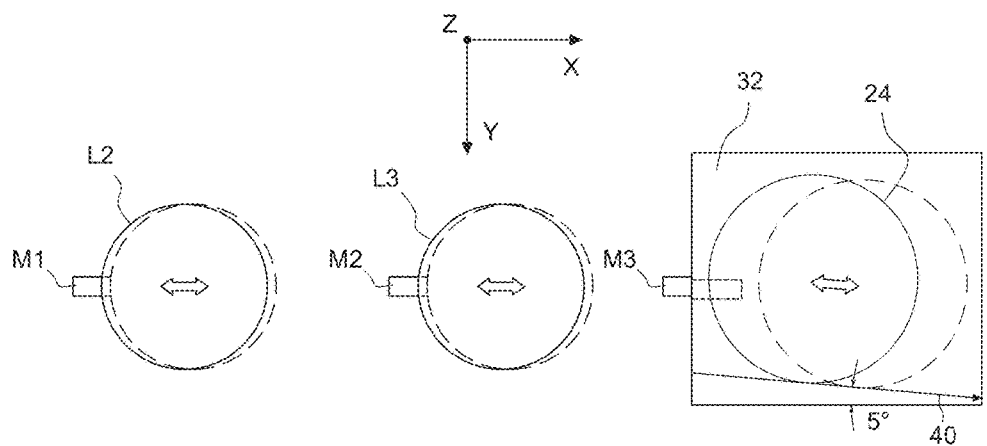
FIG. 3a is a schematic top view on the second lens contained in a projection objective, illustrating the displacement of the second lens that is brought about by a first manipulator.
FIG. 3b is a schematic top view on the third lens contained in the projection objective, illustrating the displacement of the third lens that is brought about by a second manipulator.
FIG. 3c is a schematic top view on the wafer stage and the substrate, illustrating the displacement of the substrate that is brought about by a third manipulator.

FIG. 3a is a schematic top view on the second lens L2 on which the first manipulator M1 acts. The circle in broken lines represents a displaced position of the second lens L2 if the manipulator M1 has been operated after applying a suitable control signal.

The second correction device COR2 has basically the same constitution as the first correction device COR1. It comprises a second manipulator M2 that is configured to displace the third lens L3 along the X direction. The top view of FIG. 3b on the third lens L3 on which the second manipulator M2 acts is therefore identical to the top view of FIG. 3a. Since also the third lens L3 is located closely to the first pupil plane 36, the optical effect produced by the second manipulator M2 is again substantially field independent. The third correction device COR3 is integrated into the wafer stage 32. As it can best be seen in the top view of FIG. 3c, the third manipulator M3 is configured to displace the substrate 24 along a displacement direction 40 that forms an angle of 5° with the X direction. If the third manipulator M3 is operated during a scan cycle, this oblique lateral displacement of the wafer 24 is superimposed on the continuous scan movement of the substrate 24 along the Y direction.

The third manipulator may not require additional hardware components if the wafer stage 32 is a conventional XY wafer stage that is capable of displacing the substrate 24 along arbitrary directions in the XY plane. Then the third manipulator M3 is simply a software module that finely modifies, if desired, the regular step-and-scan displacement of the substrate 24 during the exposure operation to correct image errors.

Since the substrate 24 is arranged in the image plane 30, the effect of the third manipulator M3 is again field-independent, because all field points are affected in the same manner if the substrate 24 is displaced.

The three manipulators M1, M2, M3 of the correction devices COR1, COR2 and COR3, respectively, are connected to a control unit 42 that supplies the manipulators M1, M2, M3 with electrical signals. The control unit 42 is, in turn, connected to an overall system control 44 that provides control signals to the control unit 42, to the stages 26, 32 and to the illumination system 12.

The apparatus 10 further comprises an optical wavefront sensor 46 that can be inserted, during an interruption of the exposure operation, into the image plane 30 underneath the projection objective 20. In this measuring position the optical wavefront sensor 46 is capable of measuring the optical wavefront associated with a specific field point in the image plane 30. To this end the optical wavefront sensor 46 may contain an interferometer, as it is known in the art as such.

Figure 4:
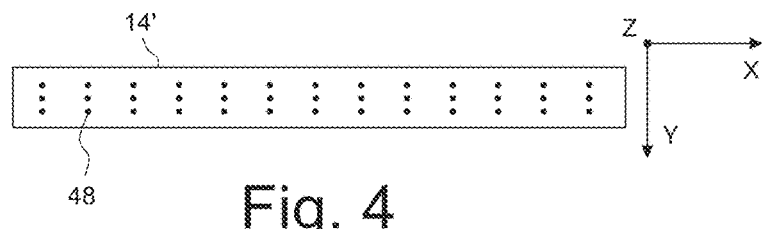
FIG. 4 is a top view on the illuminated image field illustrating an arrangement of measuring points.

The measurements of the optical wavefront with the help of the optical wavefront sensor 46 are usually performed at a plurality of field points in the image plane 30. FIG. 4 is a top view on the slit-shaped image 14' of the illuminated field 14 in the image plane 30. Dots indicate the positions of measuring points 48 where measurements of the optical wavefronts are performed. In this embodiment there are 3×13 measuring points 48 that are distributed over the slit-shaped image 14'. For measuring the optical wavefronts the substrate 24 is usually replaced by the optical wavefront sensor 46, and the wafer stage 32 is used to displace the optical wavefront sensor 46 quickly from one measuring point 48 to the next one. In this manner a measurement of the optical wavefronts at a plurality of measuring points 48 can be performed very quickly.

The projection objective furthermore comprises a plurality of other sensors that measure various properties of the projection objective and the optical elements contained therein. Such properties include, among others, the gas pressure inside the projection objective 20, the temperature at various locations, mechanical stress in mirror substrates etc. In FIG. 2 only one additional sensor 50 is schematically shown that shall represent the entirety of sensors that are used to monitor various properties of the projection objective 20. All sensors 50 transmit their measurement data to the system control 44.

The system control 44 is furthermore connected to the illumination system 12 and controls its operation. The system control 44 therefore knows the angular light distribution (illumination setting) in the object plane 28.

III. Control of Manipulators a) Determining Image Errors

During operation of the apparatus 10 the image errors of the projection objective 20 are repeatedly determined. This will usually involve that the optical wavefront sensor 46 measures the optical wavefronts at the measuring points 48, as this has been described above. However, because the exposure operation has to be interrupted for such measurements, they are performed comparatively rarely, for example every few minutes. Since the image errors may change on a much shorter time scale, for example seconds or even shorter, the image errors are often determined between the measurements by extrapolation. To this end the system control 44 may carry out simulation programs that are capable of determining the image errors based on the recent results of the optical wavefront measurements on the one hand and the signals supplied by the additional sensors 50 on the other hand. Thus the image errors of the projection objective 26 are determined by combining measurements with simulations, with periods lasting only seconds or even several milliseconds.

The apparatus 10 attempts to correct image errors determined in this manner as soon as possible. Only when even small image errors are corrected, it can be ensured that the image errors do not increase to such an extent that the tight specifications for the image quality of the projection objective 20 are exceeded. This involves quickly controlling the manipulators M1 to M3 depending on the image errors that are periodically determined. The period for the control of the manipulators M1 to M3 may be equal to the period of the determination of the image errors and may thus lie on a time scale of a few seconds or even a few milliseconds.

Determining how the image errors are affected if the manipulators M1 to M3 are supplied with certain control signals is usually an easy task. If it is known how each manipulator M1 to M3 affects the optical wavefronts, the effect on the optical wavefronts produced by applying certain control signals to the manipulators M1 to M3 can be easily computed. This is because the effects, which are produced by each manipulator individually, can, at least approximately, be linearly superimposed. However, finding control signals for the manipulators M1 to M3 that produce a desired corrective effect is a much more complicated task, because it involves the solution of what is referred to in the art as inverse problem. In the following this will be explained in more detail using a simple example.

b) Decomposition Into Zernike Polynomials

Image errors in optical systems are often described with reference to deviations of optical wavefronts from an ideal spherical optical wavefront. The wavefront deformation is a scalar two-dimensional function $\omega_i(\rho,\varphi)$ in which $(\rho,\varphi)$ are polar pupil coordinates. The wavefront deformation $\omega_i(\rho,\varphi)$ associated with a field point i may then be expanded into Zernike polynomials $Z_j$ according to $$\omega_i(\rho, \varphi) = \sum_{j=1}^{n} a_{ij} Z_j(\rho, \varphi) \tag{1}$$

In equation (1) $Z_j$ are Zernike polynomials using the non-standard single index scheme, and the expansion coefficients $a_{ij}$ are usually referred to as Zernike coefficients.

c) Determination of Sensitivities

Before the operation of the apparatus 10 commences, it has to be determined how the optical properties of the projection objective 20 alter if the manipulators M1 to M3 are activated. This determination is made separately for each manipulator M1 to M3 by applying a certain control signal, for example x=1, to only one manipulator, while no control signals are applied to the remaining manipulators. The one manipulator then produces a change of an optical property of at least one optical element that is associated to the one manipulator.

Applied to the embodiment shown in FIG. 2, this means that a signal $x_1=1$ is applied to the first manipulator M1, and signals $x_2=0$ and $x_3=0$ are applied to the other two manipulators M2, M3. Then the optical wavefront is measured in the image plane 30, for example with the help of the wavefront sensor 46. Usually this measurement has to be performed at a plurality of field points, for example at the measuring points 48 that have been explained above with reference to FIG. 4. In the simple embodiment shown in FIG. 2 all manipulators M1 to M3 have a field independent effect, and thus it suffices to measure the optical wavefront only at one point in the image plane 30.

Instead of measuring the optical wavefront in the image plane 30, it is possible to calculate the optical wavefront using an optical design program such as Code V, ZEMAX or Oslo. These design programs compute the optical wavefront usually on the basis of ray tracing algorithms.

The optical effect (i.e. wavefront deformation) that is brought about by a manipulator $M_k$ is usually referred to as its sensitivity $m_k$. In the following it is assumed that the sensitivity $m_1$ associated with the first manipulator M1 is given by $$m_1(x_1=1)=a_{12}\cdot Z_2+a_{13}\cdot Z_3+a_{17}\cdot Z_7=1\cdot Z_2+0\cdot Z_3+0.1\cdot Z_7 \quad (2)$$

using the expansion of the wavefront deformation in Zernike polynomials as indicated in equation (1). In other words, displacing the second lens L2 along the X direction by a distance that corresponds to a control signal $x_1=1$ has an effect on the optical wavefront that can be described by only two Zernike terms $Z_2$ and $Z_7$ in the expansion according to equation (1). The Zernike coefficients for Zernike polynomials $Z_2$, $Z_3$ and $Z_7$ are $a_{12}=1$, $a_{13}=0$ and $a_{17}=0.1$, respectively.

Figures 5, 6, 7:
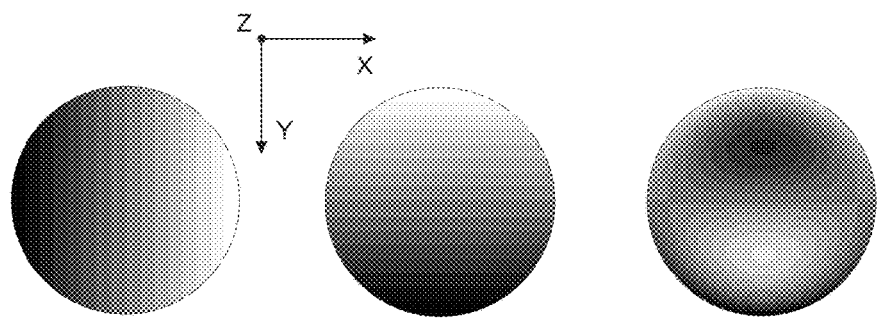
FIG. 5 is a graph representing a $Z_2$ Zernike polynomial.
FIG. 6 is a graph representing a $Z_3$ Zernike polynomial.
FIG. 7 is a graph representing a $Z_7$ Zernike polynomial.

FIGS. 5 to 7 illustrate the two dimensional Zernike polynomials $Z_2$, $Z_3$ and $Z_7$ using again the non-standard single index scheme. It can be seen that the Zernike polynomial $Z_2$ corresponds to a tilt along the X direction, the Zernike polynomials $Z_3$ corresponds to a tilt along the Y direction, and the Zernike polynomials $Z_7$ corresponds to a coma aberration. The sensitivity $m_1$ according to equation (2) thus expresses that a displacement of the second lens L2 along the X direction basically induces a tilt along the X direction of the optical wavefront. This implies that a field point in the image plane 30 is displaced along the X direction by an amount that is proportional to the Zernike coefficient $a_{12}=1$. The displacement of the second lens L2 along the X direction induces also a small coma aberration, because equation (2) contains also a small coefficient $a_{17}=0.1$ for Zernike polynomial $Z_7$. Thus the displacement of the second lens L2 brought about by the manipulator M1 results in a superposition of a strong tilt (FIG. 5) and a weak coma aberration (FIG. 7) in the optical wavefront.

Such a determination of the sensitivities is performed individually for the other two manipulators M2 and M3 as well. Here it is assumed that the sensitivities $m_2$ and $m_7$ are given by $$m_2(x_2=1)=1\cdot Z_2+0\cdot Z_3+0.11\cdot Z_7$$

$$m_3(x_3=1)=0.99\cdot Z_2+0.10\cdot Z_3+0\cdot Z_7 \quad (3)$$

The three sensitivities $m_1$, $m_2$ and $m_3$ can be written in vector form as $$m_1=\begin{pmatrix}1.00\\0.00\\0.10\end{pmatrix},\ m_2=\begin{pmatrix}1.00\\0.00\\0.11\end{pmatrix}\ \text{and}\ m_3=\begin{pmatrix}0.99\\0.10\\0.00\end{pmatrix} \quad (4)$$

or can be combined to form the sensitivity matrix S:

$$S=\begin{pmatrix}1.00 & 1.00 & 0.99\\0.00 & 0.00 & 0.10\\0.10 & 0.11 & 0.00\end{pmatrix} \quad (5)$$

If, for example, the control signals applied to the manipulators M1 to M3 are $x_1=1$, $x_2=0$ and $x_3=2$, or written in vector form $$\vec{x}=\begin{pmatrix}1\\0\\2\end{pmatrix}, \quad (6)$$

the effect on the optical wavefront can be described by $$\vec{b}=\begin{pmatrix}1.00 & 0.00 & 0.99\\0.00 & 0.00 & 0.10\\0.10 & 0.11 & 0.00\end{pmatrix}\cdot\begin{pmatrix}1\\0\\2\end{pmatrix}=\begin{pmatrix}2.98\\0.20\\0.10\end{pmatrix}=2.98\cdot Z_2+0.2\cdot Z_3+0.1\cdot Z_7 \quad (7)$$

or generally written as $$\vec{b}=S\cdot\vec{x} \quad (8)$$

d) Determination of Control Signals

As mentioned above, the computation of the optical effect on the optical wavefront upon supplying control signals $\vec{x}$ to the manipulators M1 to M3 is a straightforward task, because equation (8) can be solved very quickly. However, for correcting the wavefront errors in the projection objective 20 the inverse problem has to be solved. In other words, the problem has to be solved how the control signals $\vec{x}$ have to be selected so that a desired corrective effect $\vec{b}$ is achieved. Mathematically this inverse problem can be described by $$\vec{x}=S^{-1}\cdot\vec{b} \quad (9)$$

Equation (9) is obtained from equation (8) by multiplying it with the inverse matrix $S^{-1}$. The inverse matrix has the property that $$S\cdot S^{-1}=E \quad (10)$$

with E being the identity matrix. If the sensitivity matrix S is invertible, the inverse matrix $S^{-1}$ can be computed using algorithms that are well known in the art. Then also equation (9) could be quickly solved each time the desired corrective effect $\vec{b}$ changes.

Usually, however, the sensitivity matrix S is not invertible. Although the three sensitivities forming the sensitivity matrix S are linearly independent, i.e. none of the sensitivities $m_1$, $m_2$ and $m_3$ is a linear combination of the other two, they do not fulfill the desired properties for operating the projection apparatus because the admissible ranges for the manipulators M1 to M3 are evidently restricted by physical boundaries. For example, the lenses L2 and L3 may be displaced along the X direction only by a distance of a few micrometers. The same also applies to the third manipulator M3 that displaces the substrate 24 along the slightly inclined displacement direction 40.

How these boundaries affect the ability to find a solution for equation (9) becomes clear from the following example. It is assumed that the desired corrective effect $\vec{b}$ is given by $$\vec{b}=\begin{pmatrix}1\\0\\1\end{pmatrix} \quad (11)$$

and the control range of each manipulator $M_k$ is restricted by $|x_k|<3$. Although in this example the sensitivity matrix S is indeed invertible, the solution of equation (9) results in the control signals $$\vec{x} = \begin{pmatrix} -89 \\ 90 \\ 0 \end{pmatrix}. \quad (12)$$

As can be easily seen, the control signals $x_1=-89$ and $x_2=90$ grossly exceeds the allowable range restriction $|x_k|21$ 3.

If the sensitivity matrix S is not invertible, as this is usually the case, there is no exact solution of equation (9) like $\vec{x}$ as given in (12). Then it is known in the art (cf. in particular to US 2012/0188524 A1) to solve the minimization problem $$\min\|S\cdot\vec{x}-\vec{b}\| \quad (13)$$

wherein the symbol $\|\ \|$ represents the Euclidean norm. Equation (13) expresses the problem that control signals $\vec{x}$ shall be found that produce an optical effect $S\cdot\vec{x}$ which has the smallest possible deviation from the desired corrective effect $\vec{b}$. Various approaches are known in the art for solving such minimization problems. A well-known method is the Tikhonov regulization which seeks to solve the following problem instead of problem (13):

$$\min[\|S\cdot\vec{x}-\vec{b}\|^2+\gamma\|x\|^2] \quad (14)$$

with $\gamma$ denoting the Tikhonov weight. For details with respect to the Tikhonov regularization reference is made to A. Rieder, "Keine Probleme mit inversen Problemen", Vieweg, 2003 (see in particular example 3.3.11 on pages 70-71, example 3.5.3 on page 80, and chapter 4 on pages 93-105, in particular FIGS. 4.1 and 4.2 on pages 102 and 103). If this method is applied to the problem (13) with a corrective need as given by equation (11) and assuming a Tikhonov weight $\gamma=0.001$, this leads to the following control signals:

$$\vec{x}_{TK} = \begin{pmatrix} 1.41 \\ 2.05 \\ -2.44 \end{pmatrix} \quad (15)$$

In the example all control signals fulfill the allowable range restriction $|x_k|<3$; generally, however, this is not ensured when the Tikhonov regularization is applied. The absolute residual error $\Delta$ defined by $$\Delta=\|(\vec{b}-S\cdot\vec{x}_{TK})\|_{28}, \quad (16)$$

with $\|x\|_\infty=\max(|x_1|, \ldots, |x_n|)$ being the maximum norm of a vector, in this case is 0.63.

The maximum norm is often used as criterion for the residual error because usually it is not a high RMS (root means square) as such, but the maximum Zernike coefficient which most badly affects the image quality.

The Tikhonov regulization provides fast and fairly accurate results for the minimization problem as defined by equation (14). It can be shown that the theoretically best possible solution of the minimization problem (13) can be obtained using quadratic programming. Quadratic programming also ensures that the boundary conditions are met. If quadratic programming is applied to the minimization problem (13), this results in a control signals $$\vec{x}_{QP} = \begin{pmatrix} 1.51 \\ 2.82 \\ -2.82 \end{pmatrix}, \quad (17)$$

with an absolute residual error $\Delta$ of only 0.54. Here the control signals fulfill the full range restriction $|x_k|<3$, and this is not by chance, but ensured by the quadradic programming itself. However, quadratic programming cannot be performed in a real-time control of the manipulators M1 to M3 because this algorithm is too slow. Details how the quadratic programming can be applied may be found in US 2012/0188524 A1 and W. Alt, "Nichtlineare Optimierung", Vieweg 2002.

e) Virtual Manipulator

In order to benefit from the best possible off-line minimization using an quadratic programming algorithm (or another convex programming algorithm) on the one hand and simultaneously obtaining a quick real-time solution with the help of the Tikhonov regulization, a mixed approach is proposed which involves the definition of at least one virtual manipulator $M_v$. The virtual manipulator $M_v$ is configured to produce, in response to a virtual control signal applied to the virtual manipulator, preliminary control signals for at least two of the real manipulators M1 to M3 according to a predetermined control scheme. This control scheme is preferably determined in the following manner:

First, a hypothetic image error is defined. This hypothetic image error may correspond closely to a real image error that is expected to occur during the operation of the apparatus as a result of typical operating conditions. For example, the hypothetic image error could be an expected (or measured) image error that may be observed if a mask is illuminated with an X dipole illumination setting after the apparatus 10 has been operated over at least one hour so that a steady temperature distribution prevails in the lenses L1 to L5. In a second step control signals for the manipulators M1 to M3 are computed such that, if these control signals were applied to real manipulators M1 to M3, the latter will displace the lenses L2 or L3 and the substrate 24 in a manner that results in a correction of the hypothetic image error. Preferably this correction is the best correction that is possible when the boundary conditions with respect to the control ranges are met. Therefore this computation is preferably made off-line using a relatively slow quadratic programming algorithm. The appropriate formulation of the quadratic optimization problem can be found in US 2012/0188524 A1 that has been mentioned above.

These control signals represent a sensitivity $m_v$ of the virtual manipulator $M_v$, and they are referred to in the following as hypothetic control signals that are produced by the virtual manipulator $M_v$ in response to a hypothetic first virtual control signal. The functional dependency between these hypothetic control signals and the hypothetic first virtual control signal constitutes the control scheme of the virtual manipulator $M_v$.

During operation of the apparatus 10, the real-time determination of control signals is then performed in the same manner as it has been described above. Therefore a real image error is determined, a desired corrective effect is calculated on the basis of the real image error, and control signals for the manipulators are determined. The only difference is that now there are not only three manipulators M1 to M3, but four manipulators M1 to M3 and $M_v$. Equation (14) is solved using a Tikhonov regularization, which results in a first virtual control signal for the virtual manipulator $M_v$ and second virtual control signals for the each of the real manipulators M1 to M3.

From these first and second virtual control signals final control signals for the three real manipulators are computed. The final control signals are a function of the first and second virtual control signals. In the simplest case the final control signal for a particular real manipulator is simply the sum of the first virtual control signal, multiplied with the corresponding sensitivity of the virtual manipulator, and the second virtual control signal. The final control signals are finally applied to the real manipulators M1 to M3 in order to correct the real image error that occurred during the operation of the apparatus 10.

In the following the introduction of the virtual manipulator $M_v$ will be explained again, but now with reference to a specific example.

For defining the virtual manipulator $M_v$ it will be assumed, for the sake of simplicity, that the hypothetic image error is again (see equation (11)) given by $$\vec{b} = \begin{pmatrix} 1 \\ 0 \\ 1 \end{pmatrix}. \tag{18}$$

Now the best possible solution of equation (13) fulfilling a more severe range restriction $|x_k|<2.82$ is computed off-line using a quadratic programming algorithm. Why a more severe range restriction and not the full range restriction $|x_k|<3$ is applied will become clear further below.

This yields again (as discussed above with reference to equation (17)) the following solution $\vec{x}_{QP}$ for the control signals for the three real manipulators M1 to M3:

$$\vec{x}_{QP} = \begin{pmatrix} 1.51 \\ 2.82 \\ -2.82 \end{pmatrix} \tag{19}$$

These control signals are the hypothetic control signals mentioned above. The solution $\vec{x}_{QP}$ is used to define a sensitivity vector $\vec{m}_v$ for the virtual manipulator $M_v$ as $$\vec{m}_v = \begin{pmatrix} m_{v1} \\ m_{v2} \\ m_{v3} \end{pmatrix} = S \cdot \vec{x}_{QP} = \begin{pmatrix} 1.54 \\ -0.28 \\ 0.46 \end{pmatrix} \tag{20}$$

Thus, with a hypothetic first virtual signal $x_v=1$ the virtual manipulator $M_v$ produces the hypothetic control signals $\vec{x}_{QP}$ that lead to the optimum correction of the hypothetic image error.

With the additional sensitivities $\vec{m}_v$ of the virtual manipulator $M_v$ equation (13) becomes $$\min\left\| \begin{pmatrix} 1.00 & 1.00 & 0.99 & 1.54 \\ 0.00 & 0.00 & 0.10 & -0.28 \\ 0.10 & 0.11 & 0.00 & 0.46 \end{pmatrix} \cdot \begin{pmatrix} x_{r1}' \\ x_{r2}' \\ x_{r3}' \\ x_v' \end{pmatrix} - \vec{b} \right\| \tag{21}$$

wherein $x_v'$ is the first virtual control signal and $x_{r1}'$ to $x_{r3}'$ are the second virtual control signals.

Now the Tikhonov regulization is performed for the minimization problem as defined by $$\min\left[ \left\| \begin{pmatrix} 1.00 & 1.00 & 0.99 & 1.54 \\ 0.00 & 0.00 & 0.10 & -0.28 \\ 0.10 & 0.11 & 0.00 & 0.46 \end{pmatrix} \cdot \begin{pmatrix} x_{r1}' \\ x_{r2}' \\ x_{r3}' \\ x_v' \end{pmatrix} - \vec{b} \right\|^2 + \gamma \left\| \begin{pmatrix} x_{r1}' \\ x_{r2}' \\ x_{r3}' \\ x_v' \end{pmatrix} \right\|^2 \right] \tag{22}$$

with an appropriate Tikhonov weight $\gamma$. Instead of a global weight $\gamma$ there can be used separate weights $\gamma_{r1}$, $\gamma_{r2}$, $\gamma_{r3}$, $\gamma_v$ solving the modified Tikhonov regularization problem $$\min\left[ \left\| \begin{pmatrix} 1.00 & 1.00 & 0.99 & 1.54 \\ 0.00 & 0.00 & 0.10 & -0.28 \\ 0.10 & 0.11 & 0.00 & 0.46 \end{pmatrix} \cdot \begin{pmatrix} x_{r1}' \\ x_{r2}' \\ x_{r3}' \\ x_v' \end{pmatrix} - \vec{b} \right\|^2 + \left\| \begin{pmatrix} \gamma_{r1} x_{r1}' \\ \gamma_{r2} x_{r2}' \\ \gamma_{r3} x_{r3}' \\ \gamma_v x_v' \end{pmatrix} \right\|^2 \right] \tag{23}$$

The result of problem (23) with $\gamma_{r1}=\gamma_{r2}=\gamma_{r3}=10$ and $\gamma_v=1$ is given by $$\vec{x}_{TKv} = \begin{pmatrix} -0.05 \\ 0.01 \\ -0.35 \\ 0.94 \end{pmatrix} \tag{24}$$

In other words, the first virtual control signal $x_v'$ is 0.94, and the second virtual control signals $x_{r1}'$ to $x_{r3}'$ are −0.05, 0.01 and −0.35, respectively.

The final control signals, which are fed to the real manipulators M1 to M3, can be derived from $\vec{x}_{TKv}$ using equation (20). This results in the final control signals $x_i$ according to $$x_1 = -0.05 + 0.94 \cdot 1.51 = 1.37$$

$$x_2 = 0.01 + 0.94 \cdot 2.82 = 2.66$$

$$x_3 = -0.35 + 0.94 \cdot (-2.82) = 3.00 \tag{25}$$

or generally $$x_i = f(x_i', x_v') = x_i' + x_v' \cdot \vec{x}_{QPi} \tag{26}$$

Now it becomes clear why the more severe range restriction $|x_k|<2.82$ and the full range restriction $|x_k|<3$ had been applied when solving equation (13) using a quadratic programming algorithm in order to define the sensitivity vector $\vec{m}_v$ for the virtual manipulator $M_v$. If the full range $|x_k|<3$ is not completely used by the virtual manipulator, it is possible to superimpose the virtual control signals $x_{r1}'$ to $x_{r3}'$, $x_v'$ so that the final control signals $x_{r1}$ to $x_{r3}$, $x_v$ obtained by equation (25) still fulfill the full range restriction $|x_k|<3$.

It can be shown that the absolute residual error $\Delta$ is now 0.57, which is larger than the theoretical best result obtained with quadratic programming ($\Delta=0.54$), but considerably smaller than the residual error that has been obtained with the Tikhonov regulization without the assumption of a virtual manipulator ($\Delta=0.63$).

Table 1 compares the results obtained with Tikhonov regulization only, quadratic programming and the assumption of a virtual manipulator.

TABLE 1

Comparison between different computations

| METHOD | CONTROL SIGNALS | ABS. RESIDUAL ERROR |
|---|---|---|
| Exact solution (disregards boundary conditions) | $\vec{x} = \begin{pmatrix} -89 \\ 90 \\ 0 \end{pmatrix}$ | $\Delta = 0$ |
| Tikhonov regularization (fast, real-time) | $\vec{x}_{TK} = \begin{pmatrix} 1.41 \\ 2.05 \\ -2.44 \end{pmatrix}$ | $\Delta = 0.63$ |
| Quadratic programming (slow, off-line) | $\vec{x}_{QP} = \begin{pmatrix} 1.51 \\ 2.82 \\ -2.82 \end{pmatrix}$ | $\Delta = 0.54$ |
| Tikhonov regularization with virtual manipulator (fast, real-time) | $\vec{x}_{TKv} = \begin{pmatrix} 1.37 \\ 2.66 \\ 3.00 \end{pmatrix}$ | $\Delta = 0.57$ | f) Discussion

It can be seen that the Tikhonov regularization with the provision of an additional virtual manipulator $M_v$ makes it possible to obtain a better minimization (i.e. smaller residual error $\Delta$) than without the virtual manipulator $M_v$. The improvement with respect to the residual error $\Delta$ decreases slightly the more the real image error deviates from the hypothetical image error. However, it can be shown that with the provision of the virtual manipulator $M_v$ the residual error will never be larger than without the virtual manipulator $M_v$. Thus there is always a more or less significant improvement with respect to the residual error, but never a deterioration.

IV. Alternative Embodiments

In the preceding section III it has been assumed that there are only three real manipulators M1 to M3, three Zernike coefficients and only one virtual manipulator $M_v$. In reality the number of real manipulators is usually much larger than 2, for example in the order of several hundreds, with different boundary conditions applying to each real manipulator, and also the number of Zernike coefficients that are taken into account may be much larger, for example 49 or 100. Furthermore, there may be more than one virtual manipulator, for example more than 5 or more than 10 or more than 50.

If the total number of field points taken into account is P, the total number of Zernike coefficients taken into account is Z, the total number of the fieldpoint-wise and Zernike specific manipulator dependencies for each manipulator is $N=P \cdot Z$, the total number of real manipulators is M, and the total number of virtual manipulators is K, then equations (13) and (20) become $$\min \left\| \begin{pmatrix} m_{r1,1} & m_{r2,1} & \cdots & m_{rM,1} & m_{v1,1} & m_{v2,1} & \cdots & m_{vK,1} \\ m_{r1,2} & m_{r2,2} & \cdots & m_{rM,2} & m_{v1,2} & m_{v2,2} & \cdots & m_{vK,2} \\ \vdots & & \ddots & & & & & \vdots \\ \vdots & & & & & & \ddots & \vdots \\ m_{r1,N} & m_{r2,N} & \cdots & m_{rM,N} & m_{v1,N} & m_{v2,N} & \cdots & m_{vK,N} \end{pmatrix} \begin{pmatrix} x_{r1}' \\ x_{r2}' \\ \vdots \\ x_{rM}' \\ x_{v1}' \\ x_{v2}' \\ \vdots \\ x_{vK}' \end{pmatrix} - \begin{pmatrix} b_1 \\ b_1 \\ \vdots \\ b_N \end{pmatrix} \right\| \quad (27)$$

and for Tikhonov regularization $$\min \left\| \begin{pmatrix} m_{r1,1} & m_{r2,1} & \cdots & m_{rM,1} & m_{v1,1} & m_{v2,1} & \cdots & m_{vK,1} \\ m_{r1,2} & m_{r2,2} & \cdots & m_{rM,2} & m_{v1,2} & m_{v2,2} & \cdots & m_{vK,2} \\ \vdots & & \ddots & & & & & \vdots \\ \vdots & & & & & & \ddots & \vdots \\ m_{r1,N} & m_{r2,N} & \cdots & m_{rM,N} & m_{v1,N} & m_{v2,N} & \cdots & m_{vK,N} \end{pmatrix} \begin{pmatrix} x_{r1}' \\ x_{r2}' \\ \vdots \\ x_{rM}' \\ x_{v1}' \\ x_{v2}' \\ \vdots \\ x_{vK}' \end{pmatrix} - \begin{pmatrix} b_1 \\ b_1 \\ \vdots \\ b_N \end{pmatrix} \right\|^2 + \left\| G \begin{pmatrix} x_{r1}' \\ x_{r2}' \\ \vdots \\ x_{rM}' \\ x_{v1}' \\ x_{v2}' \\ \vdots \\ x_{vK}' \end{pmatrix} \right\|^2 \quad (28)$$

wherein G is an appropriate weight matrix, preferable a diagonal matrix with different weights as diagonal entries. Here $m_{ri,j}$ is the sensitivity of the real manipulator i for Zernike coefficient j, $m_{vi,j}$ is the sensitivity of the virtual manipulator i for Zernike coefficient j, $x_{vi}'$ is the first virtual control signal for the virtual manipulator i, $x_{ri}'$ is the second virtual control signal for the real manipulator i, and $b_j$ is the Zernike coefficient that describes the desired corrective effect.

Usually the wavefront deformations are field-dependent. Hence the optimization problems (27) and (28) take into account the wavefront deformations at P different field points, for example for the 3×13 measuring points 48 that are shown in FIG. 4.

For determining the final control signals on the basis of the first and second virtual control signals another function $f(x_{r1}', x_{vj}')$ may be used instead of the function according to equation (23). For example, an additional weighing factor may be provided that weighs the contribution of the first and second virtual control signals $x_{ri}'$ and $x_{vj}'$, respectively.

Figure 8:
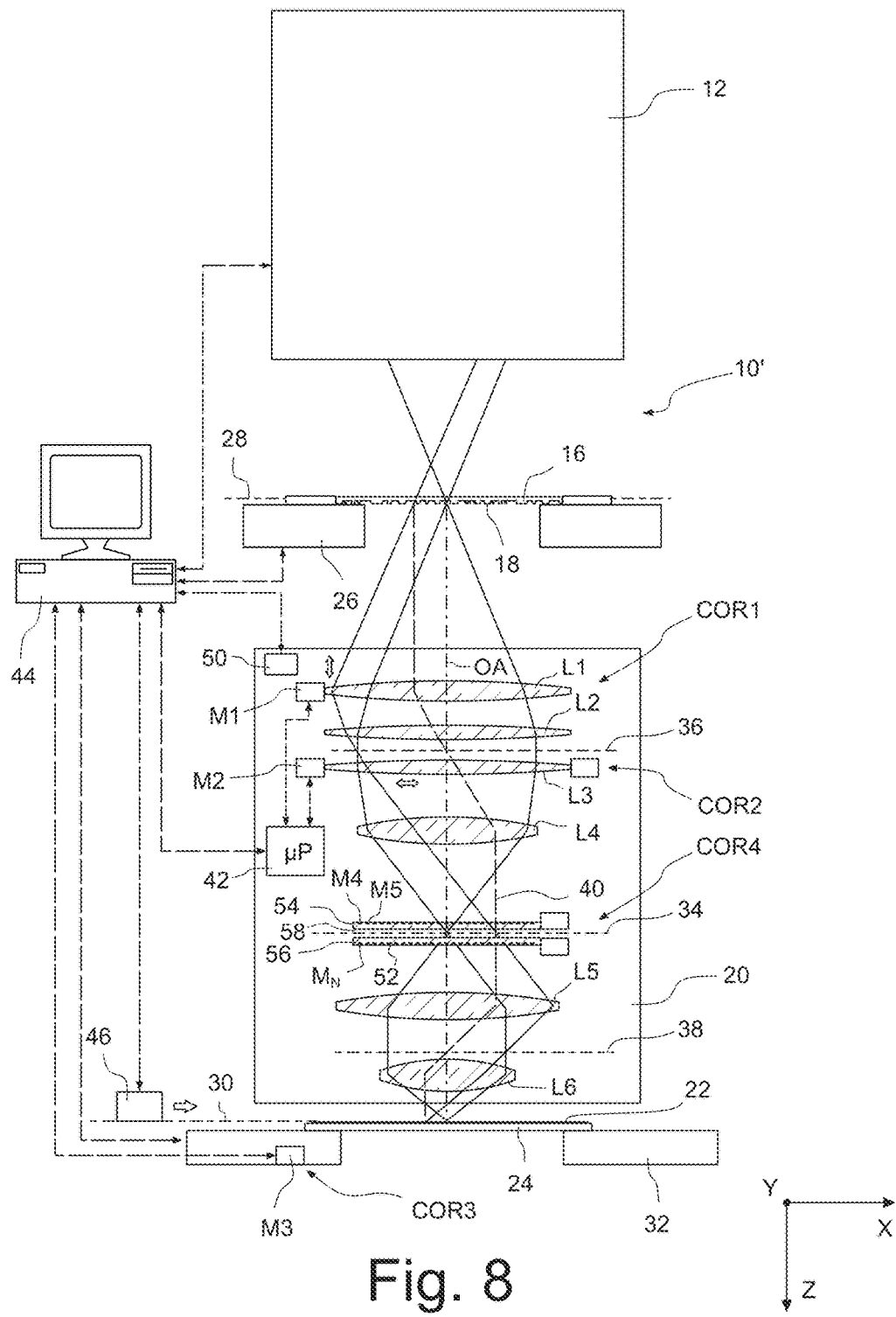
FIG. 8 is schematic meridional section through a projection exposure apparatus according to another embodiment having different manipulators.

FIG. 8 is schematic meridional section through a projection exposure apparatus 10' according to another embodiment. The apparatus 10' differs from the apparatus 10 shown in FIGS. 1 and 2 only with respect to the correction systems that are contained in the projection objective 26.

The first correction system COR1 now acts on the first lens L1 and contains a manipulator M1 that is configured to displace the first lens L1 in a direction along the optical axis OA.

The second correction system COR2 comprising manipulator M2 is identical to the second correction system COR2 shown in FIG. 2. The manipulator M2 thus acts on the third lens L3 and is configured to displace the third lens L3 along the X direction.

The third correction system COR3 comprising manipulator M3 is again identical to the third correction system COR3 shown in FIG. 2. The manipulator M3 thus acts on the substrate 24 and is configured to displace it along the oblique displacement direction 40 (see FIG. 3c).

The fourth correction system COR4 is a more complex device containing a plurality of heating wires 52 that are integrated in or applied on two plane parallel plates 54, 56. These plates 54, 56 are spaced apart from one another by a gap 58 through which a cooled gas is guided. More details with regard to the fourth correction system COR4 can be gleaned from US 2010/0201958 A1 and US 2009/0257032 A1 that have both been mentioned at the outset.

Each heating wire forms one manipulator M4 to $M_L$. Although there are only 4 correction devices COR1 to COR4 that act on different optical elements L1, L3, 24 and 54, 56, respectively, the number N of real manipulators is significantly greater, for example 300 or more. Preferably each virtual manipulator act simultaneously on the real manipulators M1 to $M_L$ of different correction devices COR1 to COR4, as this has also been the case in the embodiment shown in FIGS. 1 and 2.

V. Summary of Important Aspects of the Disclosure

Figure 9:
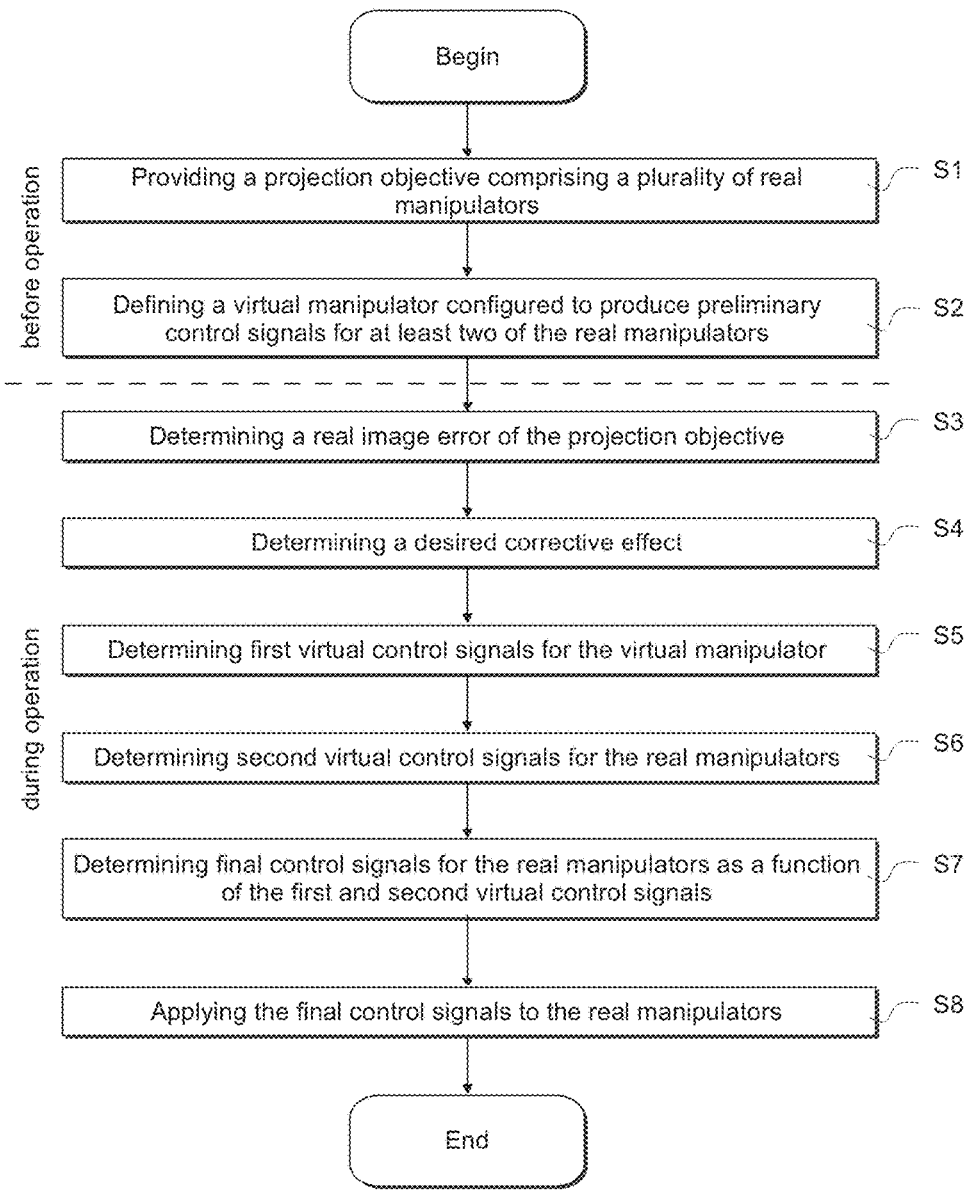
FIG. 9 is a flow diagram of important method steps in accordance with the present disclosure.

The flow chart shown in FIG. 9 summarizes important aspects of the method in accordance with the present disclosure.

In a first step S1 a projection objective comprising a plurality of real manipulators is provided.

In a second step S2 a virtual manipulator is defined that is configured to produce preliminary control signals for at least two of the real manipulators.

In a third step S3 a real image error of the projection objective is determined.

In a fourth step S4 a desired corrective effect is determined.

In a fifth step S5 first virtual control signals for the virtual manipulator are determined.

In a sixth step S6 second virtual control signals for the real manipulators are determined.

In a seventh step S7 final control signals for the real manipulators as a function of the first and second virtual control signals are determined.

In a eighth step S8 the final control signals are applied to the real manipulators.

As it is indicated in FIG. 9 by a dashed, steps S1 and S2 will usually be performed before the exposure operation of the apparatus 10 commences. The remaining steps S3 to S8 are performed during the exposure operation or during short interruptions of the exposure operation.

What is claimed is:

1. A method of operating a microlithographic projection apparatus comprising a projection objective, the projection objective comprising a plurality of optical elements arranged along a light path, the projection objective also comprising a plurality of real manipulators, the method comprising:
   one or more processing devices to perform operations comprising:
   defining a virtual manipulator, wherein defining the virtual manipulator comprises using a convex programming algorithm to determine, off-line, hypothetical control signals for the real manipulators, which provide a best possible correction of a hypothetical image error of the projection objective when applied to the real manipulators;
   during operation of the apparatus, determining:
      a real image error of the projection objective;
      a desired corrective effect that depends on the real image error; and
      depending on the desired corrective effect, a virtual control signal for the virtual manipulator and preliminary control signals for each of the real manipulators;
   determining final control signals for the real manipulators, the final control signals being a function of the virtual control signal and the preliminary control signals; and
   applying the determined final control signals to the real manipulators so that optical properties of the at least one optical element alter in a manner that results in an at least partial correction of the real image error,
   wherein the final control signal comprises allowed values that can be applied to a particular real manipulator.

2. The method of claim 1, further comprising:
   illuminating at least a portion of a mask with projection light, the mask arranged in an object plane of the projection objective; and
   forming an image of the mask in an image plane of the projection objective.

3. The method of claim 1, wherein, for each real manipulator, the real manipulator is configured to alter, in response to a final control signal applied to the real manipulator, an optical property of at least one of the optical elements.

4. The method of claim 1, wherein
   when only hypothetical preliminary control signals produced by the virtual manipulator in response to a hypothetical first virtual control signal are applied to the real manipulators, the real manipulators alter the optical property of the at least one of the optical elements in a manner that results in a modification of the hypothetical image error; and
   the hypothetical preliminary control signals are within the determined control ranges.

5. The method of claim 4, wherein the modification of the hypothetical image error comprises at least partial correction of the hypothetical image error.

6. The method of claim 4, wherein, when only the hypothetical preliminary control signals produced by the virtual manipulator in response to a hypothetical first virtual control signal are applied to the real manipulators, the real manipulators alter the optical property of the at least one of the optical elements in a manner that results in a best possible correction of the hypothetical image error according to a predefined criterion that is used to evaluate the image errors.

7. The method of claim 6, wherein:
a residual wavefront deformation, which remains after the correction of the hypothetical image error, is expanded into Zernike polynomials; and
a correction of the hypothetical image error is considered as the best possible correction when a maximum absolute value among all Zernike coefficients of this expansion is smaller than a corresponding maximum absolute value among all Zernike coefficients that are obtained if a residual wavefront error is expanded that remains after the correction of the hypothetical image error that is not corrected by the best possible correction.

8. The method of claim 4, wherein determining the control scheme comprises solving a minimization problem using a convex programming algorithm.

9. The method of claim 4, wherein the control scheme comprises a functional dependency between the hypothetical preliminary virtual control signals and the hypothetical first virtual control signal.

10. The method of claim 4, wherein the control range associated with one of the real manipulators depends on the virtual control signal and/or preliminary control signals that are supplied to another one of the real manipulators.

11. The method of claim 1, comprising the determining, for each real manipulator, how an optical wavefront passing through the projection objective is affected when a final control signal is applied to the respective real manipulator.

12. The method of claim 1, wherein determining the virtual control signal for the virtual manipulator and the preliminary control signals for each of the real manipulators comprises solving a minimization problem.

13. The method of claim 12, wherein solving the minimization problem comprises using a regularization algorithm and/or singular value decomposition with thresholding.

14. The method of claim 12, wherein solving the minimization problem comprises using the Tikhonov regularization algorithm.

15. The method of claim 1, wherein at least two real manipulators, for which the virtual manipulator produces preliminary control signals, are configured to alter an optical property of at least two different optical elements.

16. The method of claim 15, wherein the at least two different optical elements are separated from each other by at least one further optical element having a curved surface on which projection light impinges during operation of the apparatus.

17. One or more machine-readable hardware storage devices comprising instructions that are executable by one or more processing devices to perform operations comprising:
defining a virtual manipulator, wherein defining the virtual manipulator comprises using a convex programming algorithm to determine, off-line, hypothetical control signals for the real manipulators, which provide a best possible correction of a hypothetical image error of the projection objective when applied to the real manipulators;
during operation of the apparatus, determining:
a real image error of the projection objective;
a desired corrective effect that depends on the real image error; and
depending on the desired corrective effect, a virtual control signal for the virtual manipulator and preliminary control signals for each of the real manipulators;
determining final control signals for the real manipulators, the final control signals being a function of the virtual control signal and the preliminary control signals; and
applying the determined final control signals to the real manipulators so that optical properties of the at least one optical element alter in a manner that results in an at least partial correction of the real image error,
wherein the final control signal comprises allowed values that can be applied to a particular real manipulator.

18. A system comprising:
one or more processing devices; and
one or more machine-readable hardware storage devices comprising instructions that are executable by the one or more processing devices to perform operations comprising:
defining a virtual manipulator, wherein defining the virtual manipulator comprises using a convex programming algorithm to determine, off-line, hypothetical control signals for the real manipulators, which provide a best possible correction of a hypothetical image error of the projection objective when applied to the real manipulators;
during operation of the apparatus, determining:
a real image error of the projection objective;
a desired corrective effect that depends on the real image error; and
depending on the desired corrective effect, a virtual control signal for the virtual manipulator and preliminary control signals for each of the real manipulators;
determining final control signals for the real manipulators, the final control signals being a function of the virtual control signal and the preliminary control signals; and
applying the determined final control signals to the real manipulators so that optical properties of the at least one optical element alter in a manner that results in an at least partial correction of the real image error,
wherein the final control signal comprises allowed values that can be applied to a particular real manipulator.

* * * * *

UNITED STATES PATENT AND TRADEMARK OFFICE
CERTIFICATE OF CORRECTION

PATENT NO. : 10,018,907 B2
APPLICATION NO. : 15/041149
DATED : July 10, 2018
INVENTOR(S) : Boris Bittner et al.

It is certified that error appears in the above-identified patent and that said Letters Patent is hereby corrected as shown below:

In the Specification

Column 1, Line 12, after "herein" insert -- . --.

Column 17, Line 13-14, delete "$|x_k|213.$" and insert -- $|x_k| < 3$ --.

Column 17, Line 30, delete "regulization" and insert -- regularization --.

Column 17, Line 55, delete "$\Delta = \|(\vec{b} - S \cdot \vec{x}_{TK})\|_{2S}$," and insert -- $\Delta = \|(\vec{b} - S \cdot \vec{x}_{TK})\|_{\infty}$, --.

Column 17, Line 63, delete "regulization" and insert -- regularization --.

Column 18, Line 25, delete "regulization" and insert -- regularization --.

Column 20, Line 10, delete "regulization" and insert -- regularization --.

Column 21, Line 5, delete "regulization" and insert -- regularization --.

Column 21, Line 8, delete "regulization" and insert -- regularization --.

Column 22, Line 67, delete "$f(x_{r1}', x_{vj}')$" and insert -- $f(x_{ri}', x_{vj}')$ --.

Signed and Sealed this
Twenty-third Day of April, 2019

Andrei Iancu
*Director of the United States Patent and Trademark Office*